United States Patent [19]

Nee et al.

[11] Patent Number: 4,690,593
[45] Date of Patent: Sep. 1, 1987

[54] TOOL FOR CUTTING LOCKING CUPS FROM GUIDE TUBE MOUNTING SCREWS IN A NUCLEAR REACTOR

[75] Inventors: John D. Nee, Level Green; Joseph J. Hahn, Whitehall, both of Pa.

[73] Assignee: Westinghouse Electric Corp., Pittsburgh, Pa.

[21] Appl. No.: 822,182

[22] Filed: Jan. 24, 1986

[51] Int. Cl.[4] .................. B23B 41/00; B23B 47/18
[52] U.S. Cl. .................. 408/80; 29/400 N; 29/426.4; 29/723; 29/DIG. 26; 376/260; 408/129; 408/203.5; 408/67
[58] Field of Search .......... 408/79, 80, 86, 129, 408/200–203, 209, 113, 114, 203.5, 204, 207, 223–225, 67; 376/249, 260; 29/400 N, 426.1, 426.4, 723, DIG. 26

[56] References Cited

U.S. PATENT DOCUMENTS

| | | | |
|---|---|---|---|
| 1,941,551 | 1/1934 | Gjertsen | 408/200 |
| 2,814,238 | 11/1957 | Schupner | |
| 3,286,553 | 11/1966 | Spencer et al. | 408/79 |
| 4,011,024 | 3/1977 | Nakano et al. | 408/79 |
| 4,231,690 | 11/1980 | Burns | 408/80 |
| 4,590,671 | 5/1986 | Havoic-Conroy | 376/260 X |

*Primary Examiner*—Gil Weidenfeld
*Assistant Examiner*—Steven C. Bishop
*Attorney, Agent, or Firm*—L. A. DePaul

[57] ABSTRACT

A cutting tool is manually operable from above the water level in a reactor cavity pool to sever locking cups from the socket-head cap screws which hold guide tubes to the upper support plate of the upper internals of the reactor. The tool includes a support assembly adapted to be mounted on the guide tube. A motor frame is mounted on the support assembly for limited vertical movement with respect thereto and carries a hydraulic motor coupled by a vertically depending shaft to a tubular cutter for rotating same about its axis. The shaft extends through an opening in the support assembly and through a locating tube which surrounds the cutter and is receivable over the associated locking cup when the support assembly is mounted in place. A drive screw is coupled to the frame and to a shaft which extends up to the coupling tube to a manually operable crank to effect vertical movement of the frame and the cutting means coaxially with respect to the locking cup to sever its top wall from its side wall.

20 Claims, 8 Drawing Figures

U.S. Patent  Sep. 1, 1987  Sheet 1 of 2  4,690,593
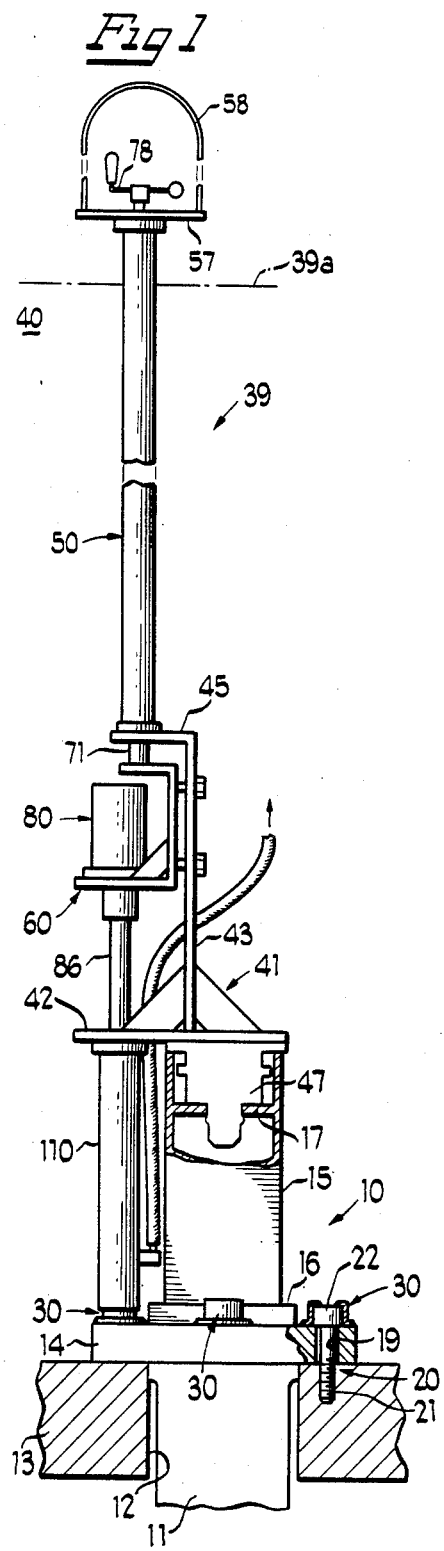
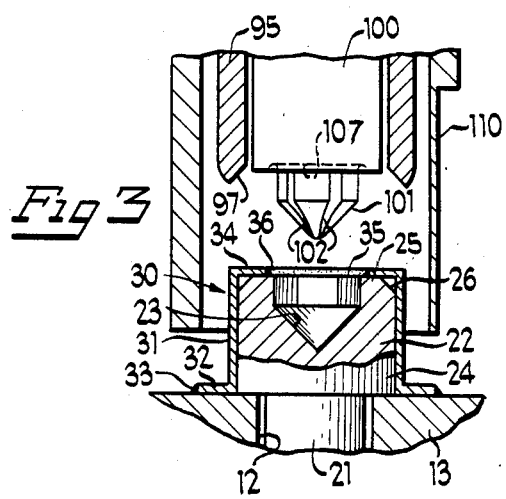
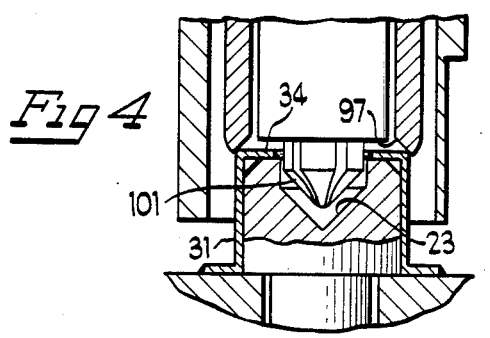
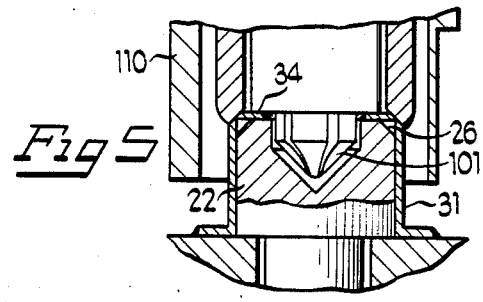
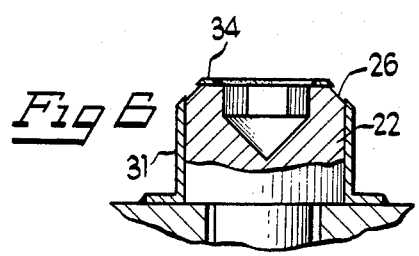

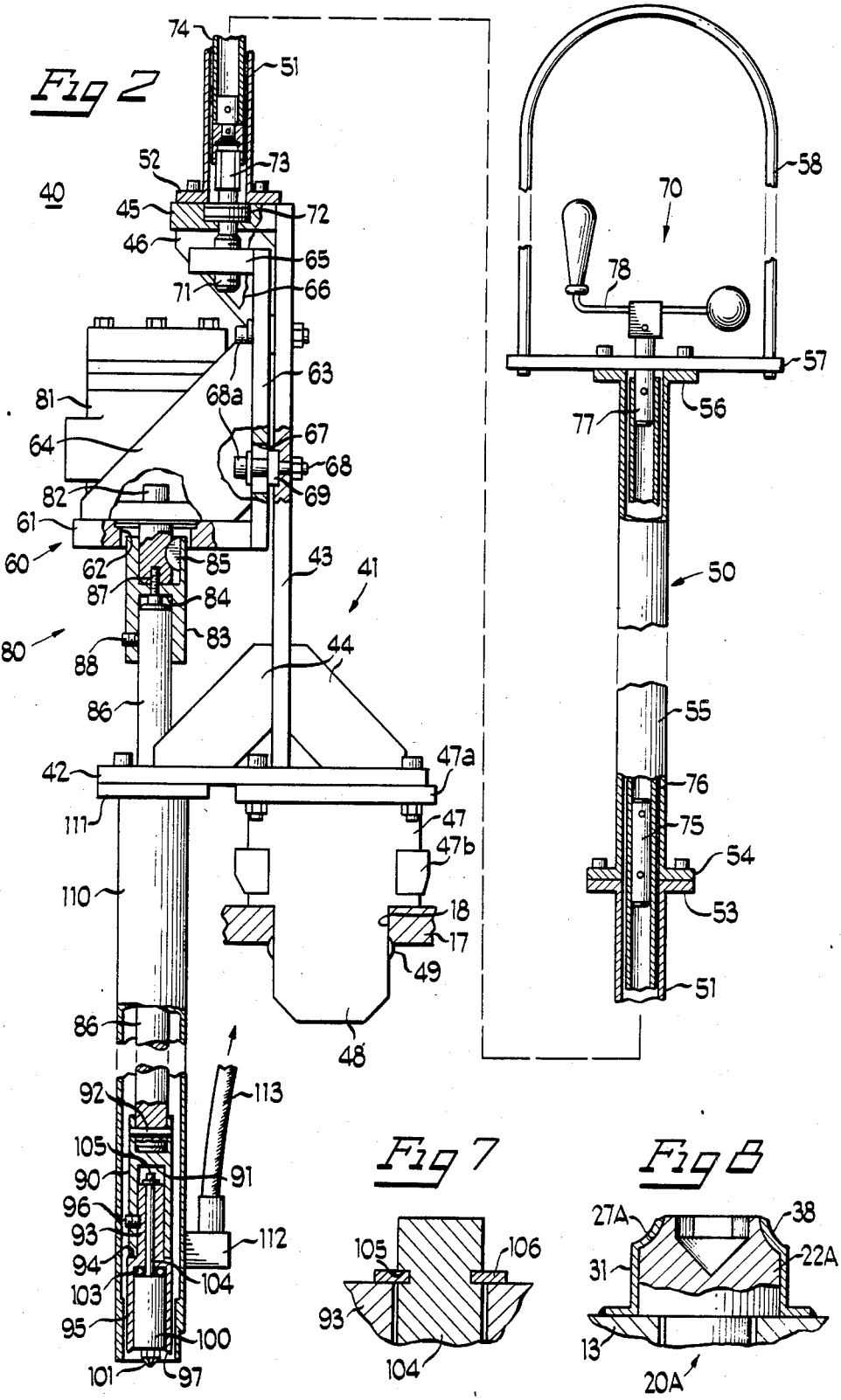

TOOL FOR CUTTING LOCKING CUPS FROM GUIDE TUBE MOUNTING SCREWS IN A NUCLEAR REACTOR

BACKGROUND OF THE INVENTION

1. Field of the Invention

The present invention relates to locking devices for screw heads, and in particular relates to means for separating the locking devices from the screw heads to permit removal of the screw.

2. Description of the Prior Art

Guide tubes are secured to the upper support plate in the upper internals of a nuclear reactor by a plurality of cap screws. These screws, after being torqued, are prevented from working loose by a locking cup, which also prevents the screw head from floating free in the event of breakage of the screw shaft. The locking cup includes a cylindrical side wall which coaxially encircles the screw head and has at its lower end a radially outwardly extending annular flange welded to the guide tube. In one type of locking cup, the upper end of the side wall is crimped or deformed into a plurality of equiangularly spaced flutes in the head of the cap screw to provide a connection between the locking cup and the screw. Another type of locking cup is provided with a radially inwardly extending annular flange or end wall at the upper end of the cylindrical side wall which partially covers the top or outer surface of the cap screw. The inner edge of this flange is welded to the cap screw.

With the first or fluted type of locking cup, the cap screw can be removed by simply untorquing it, which forces the deformed portions of the locking cup side wall back out of the flutes. The locking cup side wall can then be reshaped and reused with a new screw. In the second type of locking cup, however, simple untorquing of the cap screw results in breakage of the locking cup, with part remaining attached to the screw head and part remaining attached to the guide tube. The part remaining attached to the guide tube is not reusable and the locking cup may break up into a number of parts, resulting in loose debris. Normal replacement of the locking cups, which requires welding, is impractical because the work must be done remotely underwater to protect workers from exposure to radiation from the guide tubes. Accordingly, an effective method and apparatus for removing cap screws with this second type of locking cup is needed.

SUMMARY OF THE INVENTION

It is a general object of the invention to provide apparatus for separating a cap screw from a locking cup therefor in a radioactive environment.

An important object of the invention is the provision of apparatus of the type set forth which is capable of remote operation from a location above the water level for freeing screws disposed underwater in the upper internals of a nuclear reactor.

Another object of the invention is the provision of apparatus of the type set forth, which frees the screws in such a way that the locking cups can be reused.

Yet another object of the invention is the provision of apparatus of the type set forth, which prevents loose debris from being released into the pool of the reactor cavity.

These and other objects of the invention are attained by providing apparatus for freeing a socket-head screw from a locking cup therefor in the upper internals of a nuclear reactor, wherein the locking cup includes a fixed cylindrical side wall encircling the side surface of the screw head and an annular end wall overlying the outer end surface of the screw head, the apparatus comprising: frame means, cylindrical cutter means having a longitudinal axis and having a cutting surface with an inner diameter less than the inner diameter of the locking cup side wall and with an outer diameter greater than the outer diameter of the locking cup side wall, and drive means carried by the frame means and coupled to the cutter means for effecting rotation thereof about the axis, the rotating cutter means being operable for severing the locking cup end wall from the locking cup side wall at the junction therebetween when the cutter means is moved against the locking cup substantially coaxially therewith.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a cutting tool constructed in accordance with and embodying features of the present invention, shown mounted in its use position on a guide tube in the upper internals of a nuclear reactor in operative relation with a locking cup, with the internals structure in partial section and with the tool partially broken away;

FIG. 2 is an enlarged fragmentary view, similar to FIG. 1, with portions of the tool broken away and in section more clearly to show the construction thereof;

FIG. 3 is a further enlarged fragmentary view illustrating the relationship between the cutting tool and the locking cup just before interengagement thereof;

FIG. 4 is a view similar to FIG. 3, illustrating the parts with the cutting tool pilot disposed in the screw head socket;

FIG. 5 is a view similar to FIGS. 3 and 4, illustrating the cutting surface in cutting engagement with the locking cup;

FIG. 6 is a view of the locking cup after completion of the cutting operation;

FIG. 7 is an enlarged fragmentary view of a portion of the cutting tool of FIG. 2; and FIG. 8 is a view similar to FIG. 6, illustrating use of the remaining portion of the severed locking cup in another locking configuration with a different type of screw.

DESCRIPTION OF THE PREFERRED EMBODIMENT

Referring to FIG. 1, there is illustrated a guide tube assembly 10 disposed in the upper internals of a nuclear reactor in a reactor cavity pool 39. The guide tube assembly 10 includes a cylindrical lower guide tube 11 disposed coaxially in a bore 12 in the upper support plate 13 of the upper internals. The lower guide tube 11 has a radially outwardly extending annular attachment flange 14 at the upper end thereof which rests on the upper surface of the upper support plate 13. The guide tube assembly 10 also includes an upper guide tube 15 of square cross section mounted on the lower guide tube 11 coaxially therewith, and having an attachment flange 16 secured by suitable means to the attachment flange 14. Disposed transversely across the inside of the upper guide tube 15 adjacent to the upper end thereof is a top plate 17 having a central aperture 18 therethrough (see FIG. 2). The upper guide tube 15 may be of the type illustrated, having removable inserts (not shown) in the upper end thereof, or may be of a type having fixed inserts. The attachment flange 14 has a plurality of equiangularly spaced-apart bores 19 therethrough for respectively receiving socket-head cap screws 20, securely to fasten the lower guide tube 11 to the upper support plate 13.

Referring now also to FIG. 3, each cap screw 20 includes an elongated externally threaded shank 21 adapted for threaded engagement with the upper support plate 13 and being provided at its upper end with an enlarged head 22 having a hexagonal socket 23 formed axially therein. The head 22 has a cylindrical side surface 24 and a circular end surface 25 in which the socket 23 is formed. The head 22 is chamfered, as at 26, around the circumference thereof at the junction between the side surface 24 and the end surface 25.

Each of the cap screws 20 is retained in place by a locking cup 30. Referring in particular to FIGS. 1 and 3, the locking cup 30 has a cylindrical side wall 31 adapted to fit coaxially around the head 22 of the cap screw 20, and provided at its lower end with a radially outwardly extending annular attachment flange 32 which rests upon the upper surface of the attachment flange 14 and may be secured thereto, as by weldments 33. Integral with the side wall 31 at its outer end is a circular end wall 34 provided with a central opening 35 therethrough, which may be substantially congruent with the socket 23. Preferably, the end wall 34 is secured, as by weldments 36, to the screw head 22 around the periphery of the socket 23.

Referring now also to FIG. 2 of the drawings, there is provided a cutting tool, generally designated by the numeral 40, constructed in accordance with and embodying the features of the present invention. The cutting tool 40 includes a support assembly 41 having a flat base plate 42 disposed substantially horizontally in use, and to which is attached an upstanding, flat, rectangular mast 43, being stabilized by braces 44. Integral with the mast 43 at the upper end thereof and projecting therefrom substantially parallel to the base plate 42 is a top plate 45, which is also provided with gusset-type braces 46. Fixedly secured to the base plate 42 by suitable fasteners is an adapter plate 47a of a lifting bail 47, which depends from the plate 47a and has a reduced diameter tip 48. The lifting bail 47 carries alignment blocks 47b on opposite sides thereof, and the tip 48 thereof is preferably provided with a plurality of spaced apart and radially retractable locking balls 49, for a purpose to be explained more fully below. In the case of upper guide tubes 15 with fixed inserts, a different type of lifting bail would be used.

Secured to the top plate 45 and projecting upwardly therefrom is an elongated extension tube 50. More specifically, the extension tube 50 includes a lower section 51 having an attachment flange 52 secured to the top plate 45 by suitable fasteners, and provided at its other end with an attachment flange 53 which is suitably fastened to an attachment flange 54 at the lower end of an upper section 55. The upper section 55 is provided at its upper end with an attachment flange 56 which is fixedly secured to a plate 57, to which a handle bail 58 is attached. The extension tube 50 is of sufficient length to extend from the guide tube assembly 10 upward above the water level 39a in the reactor cavity pool, which may be a distance of as much as 30 feet. While only two sections 51 and 55 have been described for the extension tube 50, it will be appreciated that any number of sections could be used, depending upon the length required for the extension tube 50.

The cutting tool 40 also includes a frame 60 which has a flat rectangular base plate 61 provided with a circular aperture 62 therethrough. Fixedly secured to the base plate 61 at one end thereof and extending upwardly therefrom substantially perpendicular thereto is a side plate 63, being braced by a pair of gussets 64. Integral with the side plate 63 at the upper end thereof and projecting therefrom substantially parallel to the base plate 61 is a flat rectangular top plate 65, which is also braced by gussets 66. Formed through the side plate 63 are three vertically elongated slots 67, through which are received studs 68 for coupling the frame 60 to the mast 43 of the support assembly 41. Each of the studs 68 is preferably fixedly secured to the mast 43 and extends loosely through the associated slot 67, being provided with an enlarged cap 68a dimensioned so that it cannot pass through the slots 67. Spacers 69 are provided, respectively, in surrounding relationship with the studs 68 between the frame 60 and the mast 43. Thus, it will be appreciated that the frame 60 is vertically movable with respect to the support assembly 41, this movement being limited by the engagement of the studs 68 at the upper and lower ends of the slots 67.

To effect this vertical movement of the frame 60 there is provided an indexing assembly 70 which includes a drive screw 71 threadedly engaged with the top plate 65 of the frame 60 and rotatably held in a bearing 72 fixed in the top plate 45 of the support assembly 41. The drive screw 71 is connected by a coupling 73 to the lower end of an elongated connecting tube 74 which is disposed coaxially within the extension tube 50, and may comprise as many sections as does the extension tube 50. In the illustrated embodiment, the connecting tube 74 is coupled by a coaxial coupling pin 75 to another connecting tube 76, which is in turn coupled to a coupling pin 77 which projects upwardly beyond the upper end of the extension tube 50 through a complementary opening in the plate 57. Above the plate 57 the coupling pin 77 is in turn coupled to an manually operable crank handle 78 for rotating the connecting tubes 74 and 76 about their axis, thereby to effect a rotation of the drive screw 71. Since the position of the drive screw 71 is fixed, this rotation effects a corresponding vertical movement of the frame 60 either up or down depending upon the direction of rotation.

Mounted on the frame 60 is a drive assembly 80 which includes a hydraulic motor 81 mounted on the base plate 61 and having a vertically depending output shaft 82 extending through the opening 62 in the base plate 61. The output shaft 82 extends coaxially into the upper end of a coupling tube 83 and against a medial web 84 therein, being coupled to the coupling tube 83 for rotation therewith by means of a key 85 and a threaded stud 87 which extends through a complementary opening in the web 84 and into threaded engagement with the lower end of the motor output shaft 82. Receivable coaxially in the lower end of the coupling tube 83 is the upper end of a drive shaft 86, fixed axially and against rotation with respect to the coupling tube 83 by a set screw 88. The drive shaft 86 extends downwardly through a complementary opening in the base plate 42 of the support assembly 41 and has its lower end received coaxially in the upper end of a coupling tube 90 and against a medial web 91 therein, being secured in place by a dowel pin 92. Received coaxially in the lower end of the coupling tube 90 is a hollow reduced-diameter stem 93 which projects coaxially from the end wall 94 of a cutter tube 95, the stem 93 being locked against rotation with respect to the coupling tube 90 by a set screw 96. The cutter tube 95 is provided with a generally downwardly and outwardly converging frustoconical cutting surface 97 at its lower end.

Received coaxially in the cutter tube 95 is a cylindrical pilot 100 having a reduced-diameter guide pin 101 projecting downwardly from the lower end thereof coaxially therewith. The guide pin 101 has a conical tip and is provided with a plurality of flutes 102. Trapped between the upper end of the pilot 100 and the end wall 94 of the cutter tube 95 is a thrust bearing 103. Also integral with the pilot 100 and extending upwardly therefrom coaxially through the stem 94 is a rod 104. Referring to FIG. 7, the rod 104 is provided with an annular groove 105 at the upper end thereof into which a snap ring 106 is mounted for preventing retraction of the pilot 100 from the cutter tube 95. Referring to FIG. 3, the pilot 100 is provided with a shallow annular recess 107 in the lower end thereof around the outer circumference of the guide pin 101.

The cutting tool 40 also includes an elongated locating tube 110 provided at its upper end with an attachment flange 111 fixedly secured to the base plate 42 of the support assembly 41. The locating tube 110 receives coaxially therein the lower end of the drive assembly 80, including the drive shaft 86, the coupling tube 90 and the cutter tube 95, and defines a cylindrical chamber therefor. Mounted on the side wall of the locating tube 110 and communicating with this chamber is a suction fitting 112, which in turn communicates with a suction hose 113 which extends upwardly to a filter and then to a suction pump (not shown). The filter is disposed underwater, while the pump may be either underwater or above water.

Referring now in particular to FIGS. 1 and 3-6, the operation of the cutting tool 40 will now be described. The cutting tool 40 is manually lowered from a work platform above the water level into the reactor cavity pool and is mounted on a guide tube assembly 10 in an operating position illustrated in FIG. 1. More particularly, the lifting bail 47 is partially inserted in the upper end of the upper guide tube 15, with reduced diameter tip 48 inserted in the aperture 18 in the top plate 17, and with the alignment blocks 47b in engagement with the inner wall of the upper guide tube 15 to fix the tool 40 against rotation. The locating tube 110 is positioned on the support assembly 41 so as to be alignable coaxially with a selected one of the locking cups 30, depending on the orientation of the alignment blocks 47b. Then the lifting bail 47 is lowered completely into the upper guide tube 15 to the position illustrated in FIGS. 1 and 3, wherein the support assembly 41 rests upon the upper guide tube 15 and the lower end of the locating tube 110 extends telescopically down over the associated locking cup 30. Then the locking balls 49 are radially extended by suitable mechanism (not shown) to prevent retraction of the lifting bail 47 from the upper guide tube 15 and lock the cutting tool 40 in place.

Initially, the frame 60 is disposed in its fully raised position, illustrated in FIG. 3, so that the cutter tube 95 is spaced above the locking cup 30 coaxially therewith. Next, the drive motor is pressurized for rotating the cutter tube 95 about its longitudinal axis. The indexing assembly 70 is then manually rotated to lower the frame 60. More particularly, the crank handle 78 is manually operated to rotate the drive screw 71 and thereby move the frame 60 vertically downwardly. As the cutter tube 95 approaches the locking cup 30, the guide pin 101 enters the socket 23 in the screw head 22, as illustrated in FIG. 4, to ensure accurate positioning of the cutter tube 95 with respect to the locking cup 30, and to maintain the rotation of the cutter tube 95 coaxial with the locking cup 30 as the cutting operation begins.

The wall of the cutter tube 95 is substantially thicker than the side wall 31 of the locking cup 30. More specifically, the cutting surface 97 of the cutter tube 95 has an inner diameter which is less than the inner diameter of the locking cup side wall 31 and has an outer diameter which is greater than the outer diameter of the locking cup side wall 31.

As lowering of the frame 60 continues, the cutting surface 97 is brought into cutting engagement with the locking cup 30 at the junction between the side wall 31 and end wall 34 thereof, as illustrated in FIG. 5. The cutting surface 97 is preferably substantially parallel to the chamfer 26 on the screw head 22. The chamfer 26 provides a clearance between the locking cup 30 and the screw head 22 at the junction between the side wall 31 and the end wall 34 to permit severing of the end wall 34 from the side wall 31 without the cutting surface 97 substantially contacting the screw head 22. During the cutting operation, as the cutter tube 95 bears downwardly against the locking cup 30, the support assembly 41 and the remainder of the cutting tool 40 tend to pull upwardly away from the locking cup 30. However, upward movement of the cutting tool 40 in response to this reaction force is prevented by the locking balls 49 which securely lock the support assembly 41 to the upper guide tube 15. The parts are carefully dimensioned so that the end surface of the pilot 100 will engage the end wall 34 of the locking cup 30 to stop downward movement of the cutter tube 95 before the cutting surface 97 can substantially engage the screw head 22, as illustrated in FIG. 5. When this downward motion is stopped, the operator will know that the cutting is completed and the frame 60 can then be retracted. Any small particles or debris which result from the cutting operation are sucked up through the suction tube 113 and are prevented from falling free within the reactor cavity pool.

When cutting is completed, the locking balls 49 are then retracted and the cutting tool 40 is raised a sufficient distance so that the locating tube 110 clears the locking cup 30 and the alignment blocks 47b clear the guide tube 15, and then the cutting tool 40 is rotated to position the locating tube 110 over the next locking cup 30 to be cut and the operation is repeated.

Referring to FIG. 6, it can be seen that the cutting tool 40 of the present invention effects complete severing of the end wall 34 from the side wall 31 of the locking cup 30, thereby permitting the screw 20 to be untorqued and removed, taking with it the severed portion of the end wall 34 without disturbing the remaining portion of the side wall 31. It is a significant aspect of the present invention that this permits the remaining portion of the side wall 31 to be reused for locking another screw in place.

More particularly, referring to FIG. 8, a different type of socket head cap screw 20A can be mounted within the side wall 31 of the locking cup 30, the screw 20A having a head 22A which has a plurality of equiangularly spaced-apart recesses 27A in the outer surface thereof. After the screw 20A is torqued, the side wall 31 can then be formed into the recesses 27A by means of a suitable tool (not shown), to form locking projections 38 which effectively lock the screw 20A in place. With the type of locking arrangement illustrated in FIG. 7, the cap screw 20A can be untorqued, thereby redeforming the locking projections 38 back out of the recesses 27A and permitting the side wall 31 to be reused for locking another cap screw 20A in place.

From the foregoing, it can be seen that there has been provided an improved cutting tool for remotely separating a cap screw from a locking cup therefor in the underwater environment of a reactor cavity, thereby avoiding significant radiation exposure without freeing any loose debris, and resulting in a clean cut which permits the remaining portion of the locking cup to be reused for locking purposes.

We claim as our invention:

1. Apparatus for freeing a socket-head screw from a locking cup therefor in a reactor cavity, wherein the lcking cup includes a fixed cylindrical side wall encircling the side surface of the screw head and an annular end wall overlying the outer end surface of the screw head, said apparatus comprising: frame means, cylindrical cutter means having a longitudinal axis and having a frustoconical cutting surface with an inner diameter less than the inner diameter of the locking cup side wall and with an outer diameter greater than the outer diameter of the locking cup side wall, and drive means carried by said frame means and coupled to said cutter means for effecting rotation thereof about said axis, said rotating cutter means being operable for severing the locking cup end wall from the locking cup side wall at the junction therebetween when said cutter means is moved against the locking cup substantially coaxially therewith.

2. The apparatus of claim 1, and further comprising means for effecting axial movement of said cutter means.

3. The apparatus of claim 2, wherein said means for effecting axial movement comprises means for moving said frame means.

4. The apparatus of claim 2, and further comprising means for limting the axial movement of said cutter means.

5. The apparatus of claim 4, wherein said means for limiting axial movement includes stop means disposed within said cutter means for engagement with the end wall of the locking cup.

6. The apparatus of claim 5, wherein said stop means includes pilot means receivable in the socket of the screw head.

7. The apparatus of claim 5, and further comprising thrust bearing means disposed between said stop means and said cutter means for transmitting axial forces therebetween while accommodating relative rotational movement thereof.

8. The apparatus of claim 4, wherein said means for limiting axial movement includes stop means axially fixed with respect to said cutting means for movement therewith.

9. Apparatus for freeing a socket-head screw from a locking cup therefor in a reactor cavity wherein the locking cup includes a fixed cylindrical side wall encircling the side surface of the screw head and an annular end wall overlying the outer end surface of the screw head, said apparatus comprising: support means mountable in the reactor cavity, frame means coupled to said support means for movement with respect thereto, cylindrical cutter means having a longitudinal axis and having a cutting surface with an inner diameter less than the inner diameter of the locking cup side wall and with an outer diameter greater than the outer diameter of the locking cup side wall, drive means carried by said frame means and coupled to said cutter means for effecting rotation thereof about said axis, and frame control means coupled to said frame means for effecting movement thereof with respect to said support means thereby to effect a corresponding movement of said cutter means, said rotating cutter means being operable for severing the locking cup end wall from the locking cup side wall at the junction therebetween when said cutter means is moved against the locking cup substantially coaxially therewith.

10. The apparatus of claim 9, wherein the locking cup is associated with a screw securing a guide tube to an upper support plate in reactor internals, and further comprising mounting means for mounting said support means on the guide tube.

11. The apparatus of claim 9, wherein said frame control means is manually operable.

12. The apparatus of claim 11, wherein said frame control means includes a drive screw coupled to said frame means for effecting rotation thereof from a remote location spaced a considerable distance thereabove.

13. The apparatus of claim 9, wherein said frame control means effects movement of said frame means parallel to the axis of said cutter means.

14. The apparatus of claim 13, and further comprising means for limiting the movement of said frame means with respect to said support means.

15. Apparatus for freeing a socket-head screw from a locking cup therefor in reactor internals in a reactor cavity, wherein the locking cup includes a fixed cylindrical side wall encircling the side surface of the screw head and an annular end wall overlying the outer end surface of the screw head, said apparatus comprising: support means mountable on the reactor internals, frame means coupled to said support means for movement with respect thereto, cylindrical cutter means having a longitudinal axis and having a cutting surface with an inner diameter less than the inner diameter of the locking cup side wall and with an outer diameter greater than the outer diameter of the locking cup side wall, drive means carried by said frame means and coupled to said cutter means for effecting rotation thereof about said axis, frame control means coupled to said frame means for effecting movement thereof with respect to said support means thereby to effect a corresponding movement of said cutter means, locating tube means carried by said support means and coaxially receiving said cutter means therein, said locating tube means being receivable coaxially over the locking cup for positioning said cutter means with respect to the locking cup, said rotating cutter means being operable for severing the locking cup end wall from the locking cup side wall at the junction therebetween when said cutter means is moved against the locking cup substantially coaxially therewith, and suction means communicating with the interior of said locating tube means for removing therefrom debris from the cutting operation.

16. The apparatus of claim 15, wherein the locking cup is associated with a screw securing a guide tube to an upper support plate in the reactor internals, and further comprising mounting means for mounting said support means on the guide tube.

17. The apparatus of claim 15, wherein said drive means includes an hydraulic motor having an output shaft, and linkage means coupling said output shaft to said cutter means.

18. The apparatus of claim 15, wherein said support means includes a support plate having an aperture therethrough, said locating tube means being fixedly secured to said support plate in alignment with said aperture, said drive means extending through said aperture into said locating tube means.

19. The apparatus of claim 15, and further comprising manually operable handling means coupled to said support means and extending a considerable distance thereabove for permitting remote manipulation thereof.

20. The apparatus of claim 19, wherein said handling means includes an elongated tubular means, said frame control means including shaft means extending through said tubular means, drive screw means coupled to said shaft means and to said frame means, and manually operable means connected to said shaft means at the upper end thereof for effecting rotation thereof.

* * * * *